United States Patent Office 2,876,227
Patented Mar. 3, 1959

2,876,227

WERNER COMPLEXES OF ISOQUINOLINE

William D. Schaeffer, Pomona, Calif., assignor to Union Oil Company of California, Los Angeles, Calif., a corporation of California No Drawing. Application November 19, 1956
Serial No. 622,835

5 Claims. (Cl. 260—270)

This invention relates to certain new Werner complexes which are found to exhibit the unusual property of selectively absorbing, or "clathrating," ortho-xylene and/or meta-xylene into their crystal structure in preference to para-xylene and ethylbenzene. They strongly reject p-xylene, and may hence be advantageously employed for removing traces of o-xylene and/or m-xylene from crude p-xylene concentrates. They also exhibit a selectivity for o-cymene in preference to p-cymene or m-cymene.

The new complexes consist of certain metal thiocyanates coordinated with substantially four moles of isoquinoline. They may be designated by the following general formula:

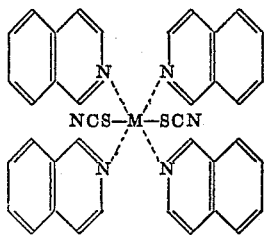

wherein M is a metal of atomic number 25 to 28 (i. e. manganese, iron, cobalt or nickel).

When any of the above complexes are triturated with, or precipitated in the presence of, a liquid mixture of isomeric xylenes, it is found that the o-xylene and/or m-xylene is selectively integrated into the crystal structure, forming what is presently regarded as a "clathrate." The remaining xylenes are correspondingly enriched in p-xylene. The solid clathrate may then be separated from the liquid phase, and decomposed with acid or heat to recover the selectively clathrated hydrocarbon.

The new complexes may be easily prepared by simply admixing the proper mole-ratios of metal thiocyanate and isoquinoline, normally at room temperatures, although higher or lower temperatures may be employed. If desired the metal thiocyanate may be first dissolved in a solvent such as water and the complex precipitated by addition of the isoquinoline. The complexes are substantially insoluble in water, and soluble in chloroform and aromatic hydrocarbons.

When working in aqueous solutions, it is not essential to start with pure metal thiocyanates. Any soluble salt which forms a more soluble complex with isoquinoline than does the thiocyanate may be initially dissolved in the solvent; thiocyanate ions are then added, and finally the isoquinoline, whereupon the less soluble thiocyanate complex is selectively precipitated in accordance with the laws of mass action. The complexes of the metal halides are much more soluble in water than the corresponding thiocyanates, and hence it is convenient to use solutions of metal chlorides or bromides as starting materials, first adding a soluble thiocyanate, e. g. sodium, potassium, or ammonium thiocyanate, then adding the isoquinoline. The resulting precipitate is then recovered by filtration, washed with water or other appriate solvent, and dried at low temperatures, e. g. 25°–100° C. Higher temperatures are likely to cause decomposition.

EXAMPLE I

About 94.8 gms. (0.4 mole) of nickel chloride ($NiCl_2 \cdot 6H_2O$) was dissolved in 2 liters water, and 77.6 gms. (0.8 mole) of potassium thiocyanate was added thereto. To the resulting solution was then added 207 gms. (1.6 mole of isoquinoline, stepwise with stirring. A blue-grey precipitate was formed, which was filtered off, washed with water and finally air dried at room temperature. The yield was substantially theoretical, and the product was soluble in chloroform, and fairly soluble in benzene. By elemental analysis the purified product was found to contain: C—62.5%, H—4.26%, N—10.7%, Ni—8.3%, SCN—17.8%, and was hence nickel tetra(isoquinoline)dithiocyanate.

By substituting mole-equivalent proportions of manganese, iron or cobalt chlorides for nickel chloride in the above example, the corresponding Werner complexes are obtained in similar yields and purities. The resulting complexes are:

| Complex | Physical Appearance |
|---|---|
| 1. Manganous tetra(isoquinoline)dithiocyanate | Light yellow solid. |
| 2. Ferrous tetra(isoquinoline) dithiocyanate | Tan solid. |
| 3. Cobalt tetra(isoquinoline) dithiocyanate | Pink solid. |

All of the above complexes exhibit selective clathrating properties for o-xylene and m-xylene, similar to that shown in the following example:

EXAMPLE II

To 25 ml. of a substantially saturated chloroform solution of the Werner complex of Example I (nickel tetra-(isoquinoline)dithiocyanate), was adde 20 ml. of mixed xylenes and the solution was allowed to stand at room temperature for 15 minutes with occasional stirring. A blue crystalline precipitate slowly formed, and was recovered by filtration, and air-dried for 2½ hours. The dry precipitate was then dissolved in about 20 ml. of dilute (50/50) HCl, and the solution was shaken with 5 ml. of heptane to extract the liberated xylene. The hydrocarbon phase was separated and washed with HCl and water and dried over $Na_2SO_4$. Ultra violet spectranalysis of the hydrocarbon phase, and of the original xylene, showed that the isomer distribution was as follows:

Table 1

| | Volume percent | | | |
|---|---|---|---|---|
| | p-xylene | m-xylene | o-xylene | Et. Bz. |
| Feed | 19.3 | 49.5 | 16.5 | 14.8 |
| Hydrocarbon from Clathrate | 3.0 | 62.7 | 27.6 | 6.7 |

The above data clearly demonstrates the strong selectivity of the complex for o- and m-xylene, as opposed to p-xylene and ethylbenzene.

EXAMPLE III

A 200 gm. saturated chloroform solution of nickel tetra(isoquinoline) dithiocyanate was diluted with an additional 100 ml. of chloroform, and 100 gms. of mixed cymenes was added. The resulting blue precipitate was filtered off, dried, and decomposed with acid as outlined in Example II. Analysis of the hydrocarbon phase showed the following isomer distribution:

*Table 2*

|  | Volume percent | | |
|---|---|---|---|
|  | p-cymene | m-cymene | o-cymene |
| Feed | 50.2 | 14.6 | 35.2 |
| Hydrocarbon from Clathrate | 38.0 | 10.0 | 52.0 |

In addition to their use as clathrate-formers, the complexes are also useful in other fields as e. g. insecticides, oil-soluble metal carriers, oxidation accelerators for paints and the like. Their solubility in many organic solvents, e. g. chloroform, renders them useful as impregnants for intimately depositing catalytic metals on hydrophobic surfaces as e. g. activated carbon and the like. Other uses will be apparent to those skilled in the art.

Other specific complexes, methods of preparation and uses will readily occur to those skilled in the art. The true scope of the invention is intended to be embraced by the following claims:

I claim:
1. A Werner complex having the formula:

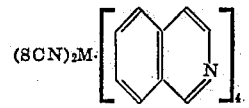

wherein M is metal of atomic number 25 to 28 inclusive.
2. Nickel tetra(isoquinoline) dithiocyanate.
3. Cobalt tetra(isoquinoline) dithiocyanate.
4. Manganese tetra(isoquinoline) dithiocyanate.
5. Ferrous tetra(isoquinoline) dithiocyanate.

No references cited.